United States Patent
Sontag et al.

(10) Patent No.: US 7,429,137 B2
(45) Date of Patent: Sep. 30, 2008

(54) PLUG CONNECTOR HAVING ELECTRIC AND OPTICAL CONTACTS

(75) Inventors: Yves Sontag, Bordeaux (FR); Sylvain Lalanne, Macau (FR); Eric Rauscent, Lormont (FR)

(73) Assignee: Thales (FR)

( * ) Notice: Subject to any disclaimer, the term of this patent is extended or adjusted under 35 U.S.C. 154(b) by 0 days.

(21) Appl. No.: 11/575,495

(22) PCT Filed: Sep. 6, 2005

(86) PCT No.: PCT/EP2005/054394

§ 371 (c)(1),
(2), (4) Date: Mar. 17, 2007

(87) PCT Pub. No.: WO2006/029975

PCT Pub. Date: Mar. 23, 2006

(65) Prior Publication Data

US 2008/0003840 A1    Jan. 3, 2008

(30) Foreign Application Priority Data

Sep. 17, 2004 (FR) .................................. 04 09886

(51) Int. Cl.
*G02B 6/36* (2006.01)
(52) U.S. Cl. ....................................................... 385/75
(58) Field of Classification Search ........................ None
See application file for complete search history.

(56) References Cited

U.S. PATENT DOCUMENTS

| | | | | |
|---|---|---|---|---|
| 4,767,181 A * | 8/1988 | McEowen | .................... | 385/78 |
| 5,930,428 A | 7/1999 | Irwin et al. | | |
| 6,543,941 B1 * | 4/2003 | Lampert | ..................... | 385/58 |
| 6,547,446 B2 * | 4/2003 | Yamaguchi | .................. | 385/53 |
| 6,612,870 B1 | 9/2003 | Rauscent | | |
| 2002/0106180 A1 * | 8/2002 | Takahashi et al. | ........... | 385/140 |

FOREIGN PATENT DOCUMENTS

DE        3112078       10/1982
JP        2004-39258 A  *  2/2004

* cited by examiner

*Primary Examiner*—Sung Pak
*Assistant Examiner*—Mike Stahl
(74) *Attorney, Agent, or Firm*—Lowe Hauptman Ham & Berner, LLP

(57) ABSTRACT

The field of the invention is that of connector sockets for electronic boards providing both electrical and optical connection. These connectors are more specifically dedicated to aeronautical applications. The invention relates to a connector socket for an electronic board comprising a mechanical frame, electrical contacts and at least one rigid optical contact placed in a seat of the mechanical frame, the optical contact being essentially comprised of one or two optomechanical ferrules. The inventive socket makes it possible to avoid the use of linking optical fibers between the socket and the optoelectronic conversion modules, while eliminating the drawbacks of integrating of optoelectronic conversion devices in the socket.

9 Claims, 5 Drawing Sheets

PLUG CONNECTOR HAVING ELECTRIC AND OPTICAL CONTACTS

CROSS-REFERENCE TO RELATED APPLICATIONS

The present Application is based on International Application No. PCT/EP2005/054394, filed on Sep. 6, 2005, which in turn corresponds to France Application No. 04 09886 filed on Sep. 17, 2004 and priority is hereby claimed under 35 USC §119 based on these applications. Each of these applications are hereby incorporated by reference in their entirety into the present application.

BACKGROUND OF THE INVENTION

1. Field of the Invention

The field of the invention is that of connector sockets for electronic boards providing for both electrical and optical connection. These connectors are more specifically dedicated to aeronautical applications.

2. Description of the Prior Art

For a certain number of applications, it is necessary to provide, between units or electronic computers, both electrical links and optical links. These links are set up using a mix of optical and electrical connectors. These connectors comprise a plug and a socket. The plug is attached to the link cable interlinking the optoelectronic devices or the computers, and the socket is normally soldered directly onto an electronic board by means of electrical contacts, also called pins.

To produce this connector, the device represented in FIG. 1 is normally used. A socket 1 is mounted on a printed circuit 4, also called PCB, standing for Printed Circuit Board. This circuit comprises electronic components 5. A plug 2 comprising both electrical contacts and optical contacts provides the link between the socket and a link cable 27 comprising electrical cables 28 and optical fibers 29. In FIG. 1, the socket 1 and the plug 2 are shown separated for clarity.

This socket 1 comprises a mechanical frame 10 comprising seats with electrical and optical contacts, 7 and 8. This socket 1 is secured to the printed circuit 4 by mechanical means which also provide the electrical link. The means shown in FIG. 1 are, by way of example, small conductive columns 9. It is also fixed to the frame 3 of the computer. The electrical links with the electrical tracks of the circuit are provided by means of conventional electrical contacts 7, also called pins, soldered onto the circuit 4. The optical contacts are of fiber type, which means that a fiber segment 8 is linked on the one hand to the socket 1 and on the other hand to an optical output of an optoelectronic conversion module 6 handling the transduction of the optical signals into electrical signals. This module can be used either to transmit, or to receive, or to transmit/receive the optical signal. It is joined to the circuit 4. The optical output of the conversion module can comprise either an optical connector, or a fiber segment directly linked to the internal optoelectronic conversion devices of the module. The module is then said to be "pigtailed". The first solution, which allows the fiber to be fitted and removed easily, is more commonly preferred over the second. It is used, in particular, with LC type optical connections.

The major drawbacks of this connection technique are, on the one hand:

the problems of securing the optical fibers leaving the socket, given the vibratory or impact-prone environmental conditions that can be extremely severe for computers on board aircraft;

the space occupied by said fibers. In practice, for the propagation of the light to be possible without significant losses inside the optical fiber, its bending radius must be greater than a minimum value as can be seen in FIG. 1 where the fiber segment 8 has a large bending radius. Observing this bending radius adversely affects the overall footprint of the optoelectronic device, particularly when the latter is a flat screen display device.

To overcome these drawbacks, the U.S. Pat. No. 5,930,428 filed by Rockwell proposes integrating the optoelectronic conversion function 6 in the socket 1 itself as indicated in FIG. 2. Thus, the socket 1 comprises no more than conventional electrical outputs 7 and the electrical outputs 71 of the conversion modules, outputs that can easily be soldered on the printed circuit 4. Thus, the problem of footprint of the socket is resolved. This solution does, however, have two drawbacks:

to maintain a reasonable footprint for the socket, the standard optoelectronic components are ill-suited. It then becomes necessary to use very large scale integration optoelectronic components that are very expensive.

Each application requires dedicated components suited to the fiber standards, the useful wavelengths and the transmitted powers.

SUMMARY OF THE INVENTION

The inventive socket makes it possible to avoid the use of linking optical fibers between the socket and the optoelectronic conversion modules, while eliminating the drawbacks of integrating optoelectronic conversion devices in the socket.

More specifically, the subject of the invention is a connector socket for an electronic board comprising a mechanical frame and at least one electrical contact, characterized in that it comprises at least one rigid optical contact placed in a seat of the mechanical frame.

Advantageously, the optical contact comprises an optical fiber segment fitted in a mechanical ferrule. It can also comprise an optical fiber segment fitted in two adjacent ferrules, said ferrules having a common axis of revolution, the optical fiber segment being centered on said axis of revolution. In a preferred embodiment of the invention, the free ends of the two ferrules have different diameters.

Advantageously, the seat and the optical contact comprise associated mechanical cushioning means ensuring that the optical contact is flexibly secured in the frame, so that said contact can slide freely inside its seat if pressure is exerted on one of its ends and resume its initial position when the pressure ceases. Said mechanical means are essentially a collar located on the optical contact and a spring located in the seat of the optical contact and surrounding the optical contact.

Advantageously, the socket comprises at the end of an optical contact in contact with the plug, an aligning sleeve, said sleeve making it possible to make the optical connection blind.

The socket can be mounted on an electronic board comprising at least one optoelectronic conversion module into which an optical contact of the socket is plugged, said board being incorporated in a computer or an optoelectronic device.

BRIEF DESCRIPTION OF THE DRAWINGS

The invention will be better understood, and other advantages will become apparent, from reading the description that follows given by way of nonlimiting example and from the appended figures, in which.

MORE DETAILED DESCRIPTION

Figure 1:
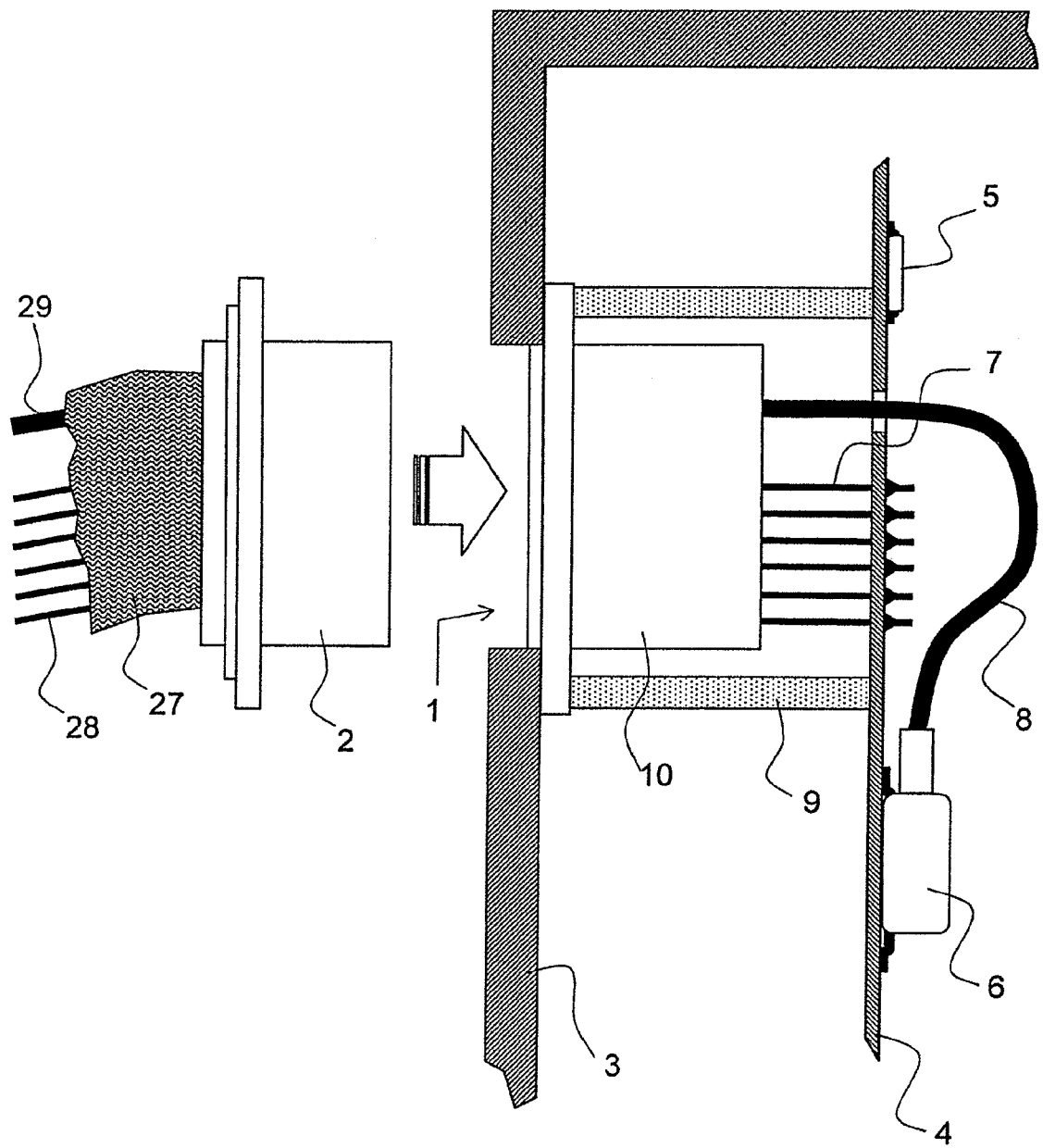
FIG. 1 represents a connector socket according to a first prior art.
Figure 2:
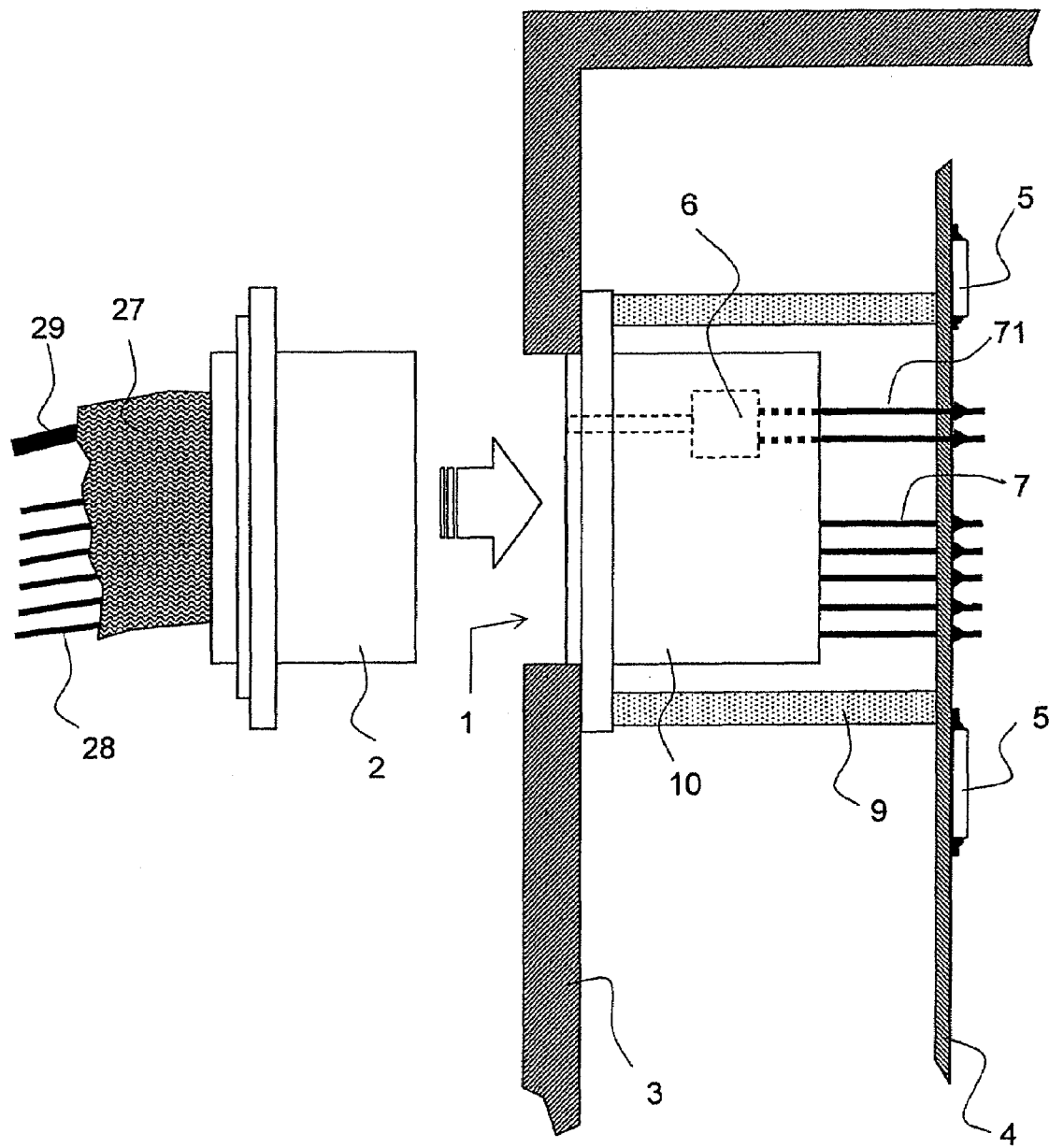
FIG. 2 represents a connector socket according to a second prior art.
Figure 3:
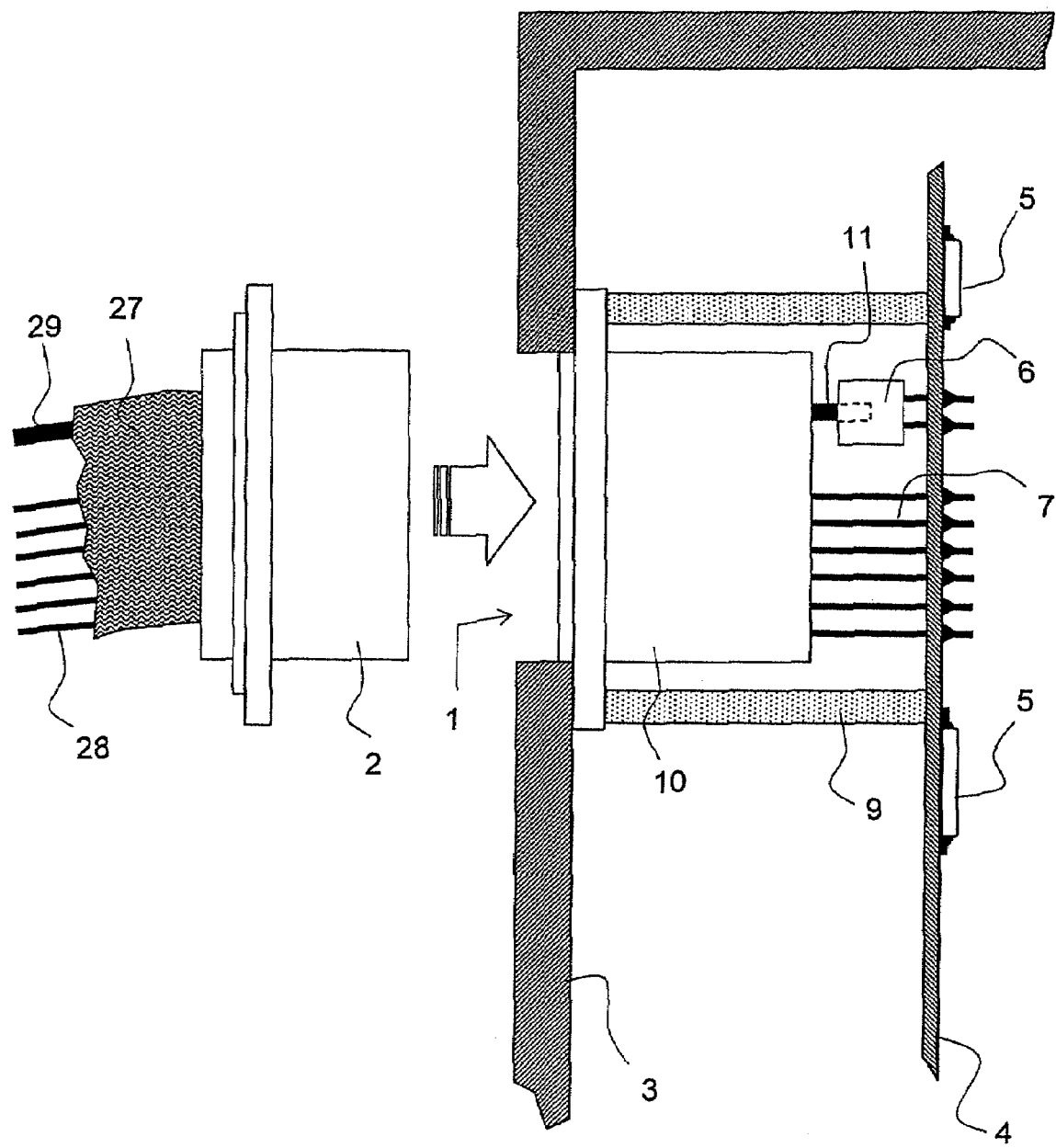
FIG. 3 represents a cross-sectional view of a socket according to the invention.

FIG. 3 represents a cross-sectional view of a socket 1 according to the invention, mounted on a printed circuit 4 comprising electronic components 5 and an optoelectronic conversion module 6.

This conversion module can operate as a receiver. It then converts the light signal into an electrical signal. The conversion module can also operate as a transmitter. It then converts the electrical signal into a light signal. These components are normally called OSA, standing for Optical SubAssembly. In the case of a transmitter, the component is a TOSA, short for Transmitter Optical SubAssembly. The transmission is then provided either by a laser diode, or by a VCSEL, standing for Vertical Cavity Surface Emitting Laser. In the case of a receiver, the component is an ROSA, standing for Receiver Optical SubAssembly and normally comprises a receive photodiode and a transimpedance amplifier.

The socket 1 essentially comprises:
a frame 10;
electrical contacts 7;
at least one optical contact 11.

The optical contact 11 plugs into the conversion module. For the link to be set up correctly with no significant optical losses, the conversion module must be perfectly positioned on the printed circuit. To obtain this positioning, a mounting template is used, positioned on the circuit while the connecting pins of the module are soldered.

This embodiment of the sockets provides numerous advantages:
- The socket is purely passive and includes no active conversion components like photoelectric transmitters or receivers. Thus, the socket is independent of the parameters of the planned application such as the transmission bit rate, the transmission protocol, the direction of transmission, the optical wavelength, etc.;
- Industrial production is easy, with no active component integration constraints and uses components that can be standard components;
- The socket and the associated plug can comply with the current standards for conventional electrical connectors.

Figure 4:
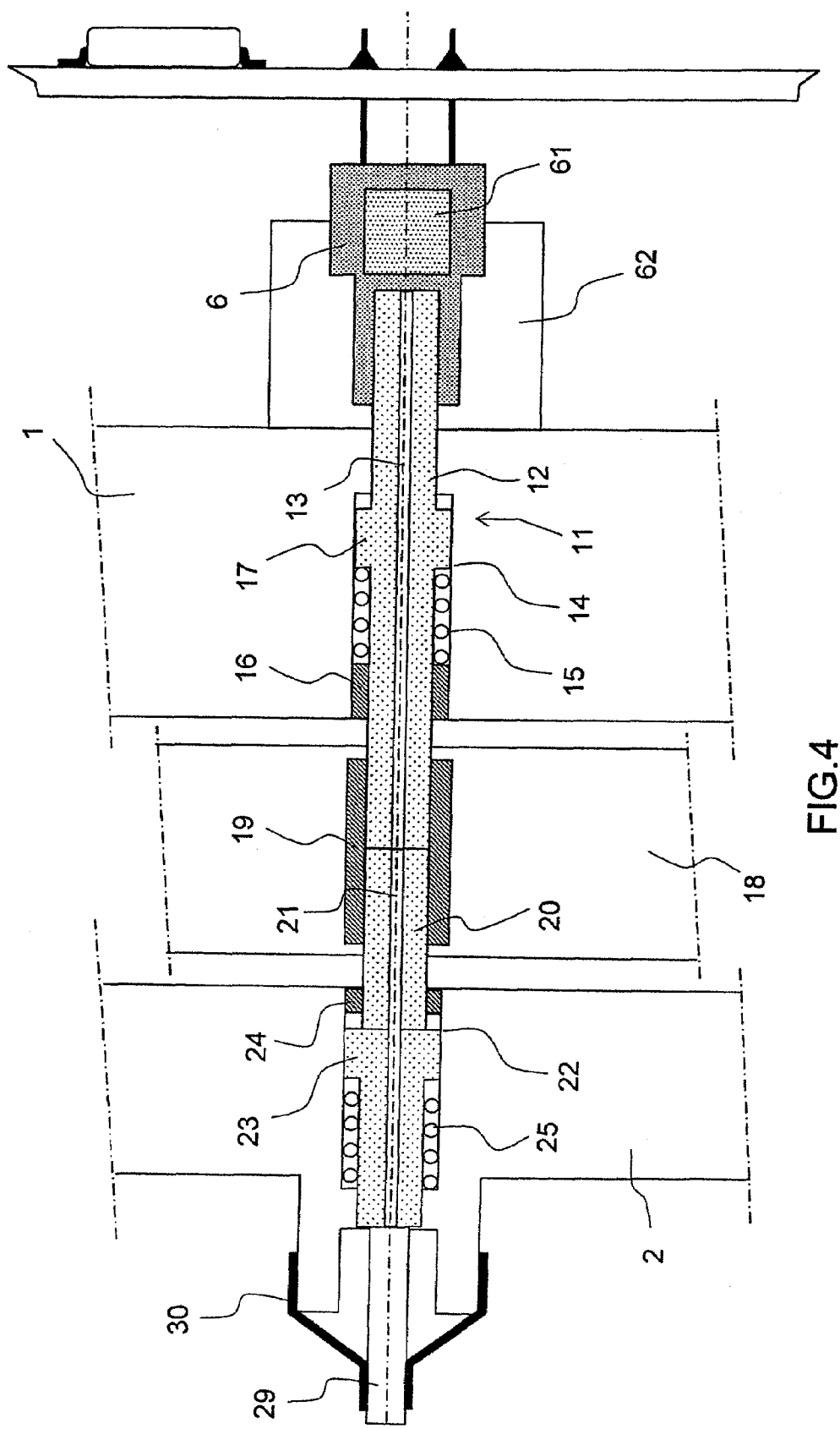
FIG. 4 represents a detail view of an exemplary optical contact according to the invention.

As a nonlimiting example, FIG. 4 represents a detail view of an exemplary optical contact 11 according to the invention. The optical contact essentially comprises a mechanical ferrule 12 comprising an optical fiber segment 13.

In FIG. 4, the ferrule is presented as a single mechanical part. Machining such a large size ferrule can prove complex and expensive. Thus, the optical contact can also comprise an optical fiber segment fitted in two adjacent ferrules, said ferrules comprising a common axis of revolution, the optical fiber segment being centered on said axis of revolution. This arrangement also makes it possible to use standard size ferrules. The ferrules can be made of ceramic, zircon which is an oxide of zirconium or metal. As a first example, the ends of the ferrule in contact with the conversion module have a diameter of 1.25 millimeters, compatible with the "LUXCIS" type connectors marketed by RADIALL. The end parts of the ferrule are not necessarily of the same diameter. As a second example, the first end of the ferrule in contact with the conversion module has a diameter of 1.25 millimeters, compatible with "LC" type connectors and the second end of the ferrule which provides the link with the plug has a diameter of 2.5 millimeters, compatible with the "ELIO" brand optical contacts marketed by SOURIAU.

The ferrule is placed in the seat 14. To provide a flexible cushioning of the ferrule in its seat 14, the latter comprises a spring 15 and an end stop 16. The ferrule 12 comprises a collar 17. The spring 15 is positioned around the ferrule in compression configuration between the end stop 16 and the collar 17. This arrangement makes it possible to provide a very good optical contact between the ferrule and the conversion module 6. The latter comprises a transmitter or a receiver 61. To simplify the assembly of the ferrule in its seat or to reduce the footprint, it is also possible to eliminate the spring. In this case, the ferrule must include a braking system to prevent it being able to exit freely from its seat when the socket is not fitted on the circuit. This system must, however, be flexible enough for the contacts of the plug to be able to push the ferrule home in the connector system of the conversion module.

To protect the optical link between the ferrule and the conversion module, a part 62 made of foam or flexible plastic is placed around the module after the socket is fitted. Thus any ingress of liquid or dirt that would degrade the efficiency of the optical link is avoided.

The second end of the ferrule must have an aligning sleeve 19. This sleeve is held in a mechanical part 18 joined to the socket and which can be removed so as to be able to easily clean the free end of the optical fiber segment 13.

As an example, the optical link between socket and plug can be provided by an optical contact comprising an optical ferrule 20 positioned in the plug 2. This ferrule 20 surrounds an optical fiber 21 located in the extension of the optical fiber segment 13. The seat 22 of the optical contact also comprises an end stop 24 which secures the ferrule in the seat and a cushioning spring 25. The spring 25 surrounds the body of the ferrule and is positioned between the bottom of the seat and a collar 23 positioned on the body of the ferrule. Outside the socket, the optical fiber 29 is surrounded by a sheath 26, and this sheath is secured on the body of the plug by a flexible part 30 which both secures the fiber and ensures seal-tightness in the plug 2.

Figure 5:
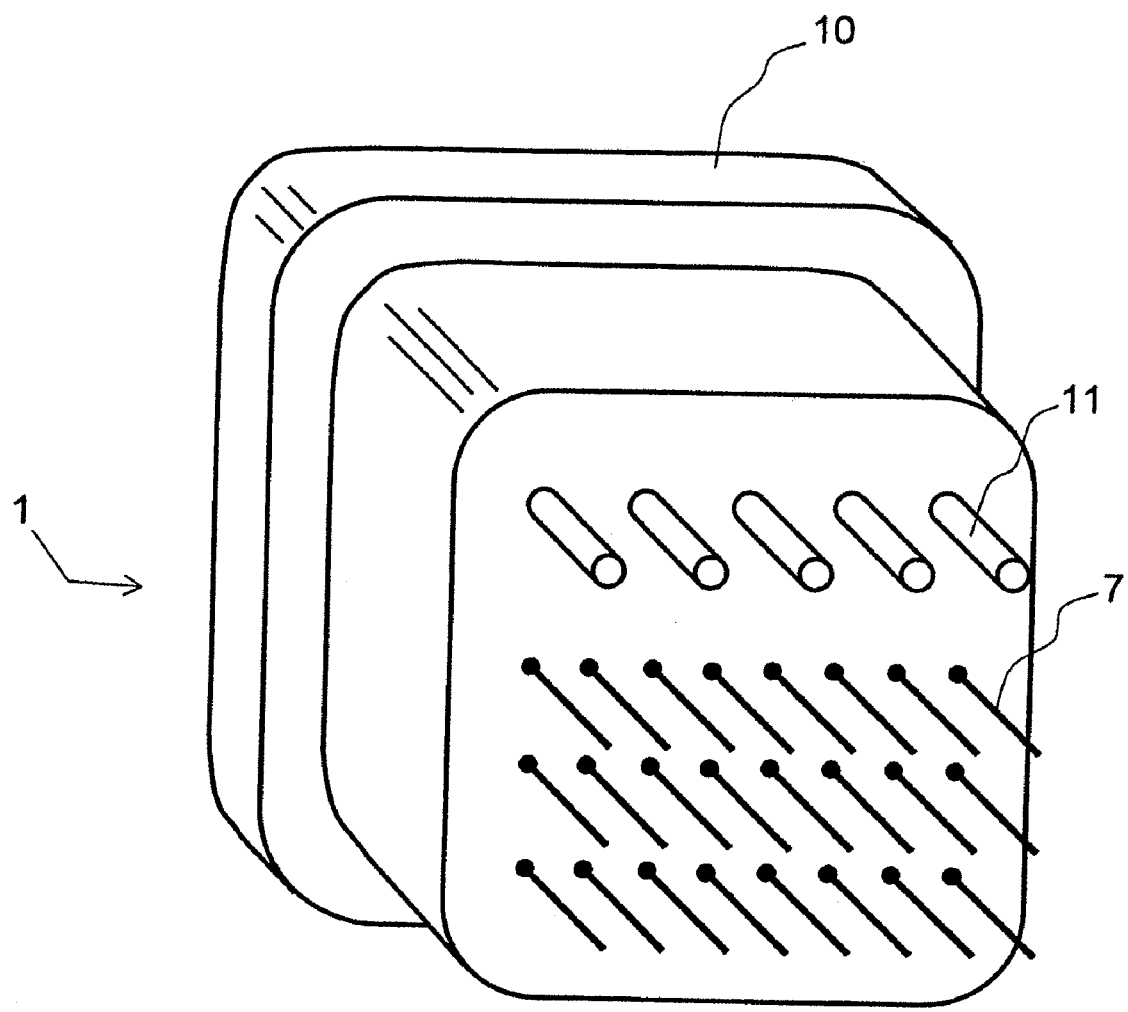
FIG. 5 represents a three-dimensional view of a socket according to the invention.

FIG. 5 represents a three-dimensional view of a socket 1 according to the invention. It comprises:
a frame 10;
electrical contacts 7 in the form of pins;
optical contacts 11.

Advantageously, the shape of the frame of the socket and the distribution of the electrical pins and of the optical contacts can be produced according to a standard. By way of nonlimiting examples, in the aeronautical field, the sockets and the corresponding plugs can be of the ARINC type, for example ARINC 600 or ARINC 404. In this case, the connector can be rackable in a support that is also called "rack" or "airframe". The connectors can also be of MIL or SUB-D type. In this case, the connectors are fitted and fastened manually.

The invention claimed is:

1. An electronic board comprising at least a socket and an optoelectronic conversion module, the socket includes a mechanical frame and at least one electrical contact and one optical contact placed in a seat of the mechanical frame, the optical contact has an optical fiber segment fitted in two adjacent ferrules, where said ferrules have a common axis of revolution, the optical fiber segment being centered on said axis of revolution, the optical contact of the socket being plugged in the optoelectronic conversion module.

2. An electronic board as claimed in claim 1, wherein the free ends of the two ferrules have different diameters.

3. An electronic board as claimed in claim 1, wherein the seat and the optical contact comprise associated mechanical means for cushioning the optical contact in the frame, so that said contact can slide freely inside its seat if pressure is exerted on one of its ends and resume its initial position when the pressure ceases.

4. An electronic board as claimed in claim 3, wherein the mechanical means are essentially a collar located on the optical contact and a spring located in the seat of the optical contact and surrounding the optical contact.

5. An electronic board as claimed in claim 2, wherein the seat and the optical comprise associated mechanical means for cushioning the optical contact in the frame, so that said contact can slide freely inside its seat if pressure is exerted on one of its ends and resume its initial position when the pressure ceases.

6. An electronic board as claimed in claim 1, wherein the socket comprises, around at least one end of at least one optical contact, an aligning sleeve.

7. An electronic board as claimed in claim 2, wherein the socket comprises, around at least one end of at least one optical contact, an aligning sleeve.

8. An electronic board as claimed in claim 3, wherein the socket comprises, around at least one end of at least one optical contact, an aligning sleeve.

9. An electronic board computer, comprising at least one electronic board as claimed in claim 1.

\* \* \* \* \*